(No Model.)

W. E. KENNEDY.
SEED PLANTER.

No. 343,819. Patented June 15, 1886.

WITNESSES

INVENTOR
Warren E. Kennedy
By C. W. Alexander
Attorney

UNITED STATES PATENT OFFICE.

WARREN E. KENNEDY, OF MARTIN'S STATION, ALABAMA.

SEED-PLANTER.

SPECIFICATION forming part of Letters Patent No. 343,819, dated June 15, 1886.

Application filed November 7, 1885. Serial No. 182,132. (No model.)

*To all whom it may concern:*

Be it known that I, WARREN E. KENNEDY, a citizen of the United States, residing at Martin's Station, in the county of Dallas and State of Alabama, have invented certain new and useful Improvements in Seed-Planters, of which the following is a specification, reference being had therein to the accompanying drawings.

My invention relates to improvements in planters designed to facilitate the planting of cotton-seed; and it consists in providing, in connection with other mechanism, a planting-cylinder, with a supplemental cylinder or chamber exterior thereto, and having an adjustable opening, the whole revolving around a stationary axle, on which is a fixed arm, in lieu of a stirrer.

Figure 1:
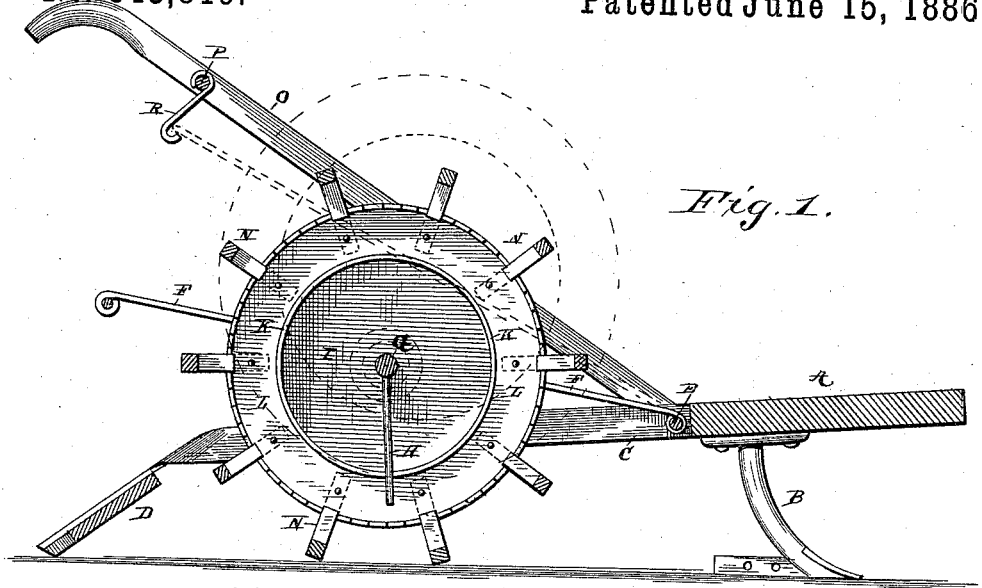
Figure 2:
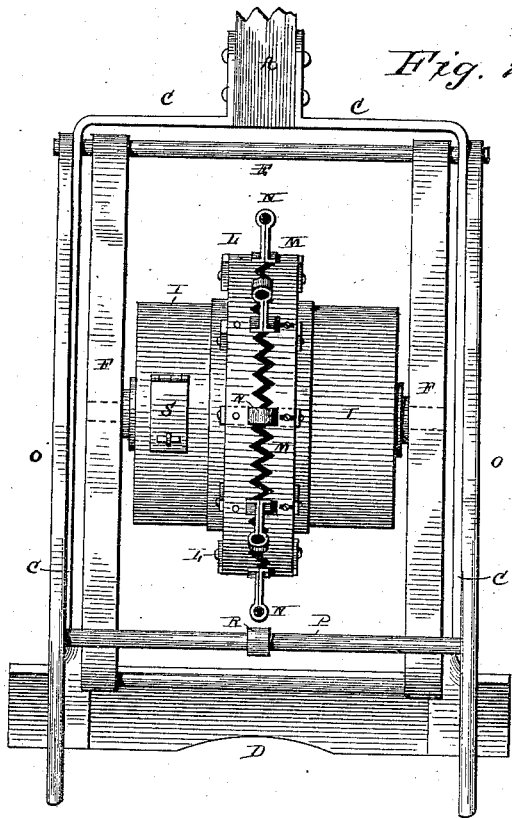
Figure 3:
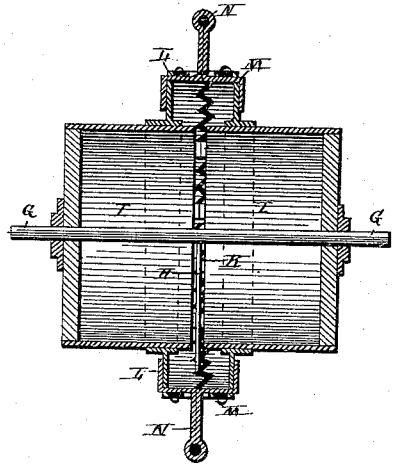

The general structure of the device is shown in the accompanying drawings, in which Figure 1 represents a longitudinal section, Fig. 2 a plan view, and Fig. 3 a detail section, of the seed-cylinder.

The beam A has secured to it the opener B and the front ends of the frames C, which together form a rectangle, and at their rear ends are bent downward at the proper angle and support the coverer D.

At the rear of the beam A, and secured to the frames C, is a cross-rod, E, to which are pivoted the front ends of supporting-bars F, to which, about at their middle portion, is secured the stationary axle G, with a fixed downwardly-extending arm about midway on it, as shown at H. On this axle freely revolves the seeding-cylinder. This cylinder consists of the main portion, I, with a central annular opening, K, for the arm H, and a supplemental exterior portion formed of a fixed part, L, with one edge of the top zigzag or toothed, and a corresponding portion with an adjustable toothed top, M. This supplemental cylinder or chamber surrounds that portion of the main cylinder I that is provided with the opening K, and receives the arm H, the end of which rests above the zigzag opening in the said supplemental cylinder. Centrally from said supplemental cylinder extend the radial arms N, which travel on the ground and support the seeding-cylinder. The handles O are joined near the back by a rod, P, from which depends a hook, R, for sustaining the seeding-cylinder in an elevated position, as shown in dotted lines, Fig. 1. Seed having been placed in the cylinder I, through the door S, as the cylinder revolves it will naturally fall through the opening K into the supplemental cylinder, from whence it passes through the opening therein and falls in the furrow caused by the opener. The arm H constantly agitates the seed and prevents its clogging or dropping in bunches, and compels it to fall into the zigzag opening, whether the amount of seed in the main cylinder be great or small, thus making the planter regular. The shape of the opening (zigzag) and the "walking" motion of the cylinder also prevent clogging and cause the proper planting of the seed.

I claim—

1. A seeder having a revolving hopper or cylinder with a central annular opening, a supplemental cylinder or chamber with a central opening and surrounding the main cylinder, coincident with the opening therein, and a stationary axle with a fixed arm extending into the said supplemental cylinder, substantially as specified.

2. A seeder having a revolving seed-cylinder with a central annular opening, a supplemental exterior cylinder or chamber with an adjustable zigzag opening, and a stationary axle with a fixed arm extending into said supplemental cylinder, substantially as specified.

In testimony whereof I affix my signature in presence of two witnesses.

WARREN E. KENNEDY.

Witnesses:
A. R. OXFORD,
JAS. McDONALD.